June 2, 1959
T. Q. ELIOT
2,889,207
METHOD FOR RECOVERY OF SULFUR FROM HYDROGEN
SULFIDE-CONTAINING GASES
Filed Nov. 12, 1954
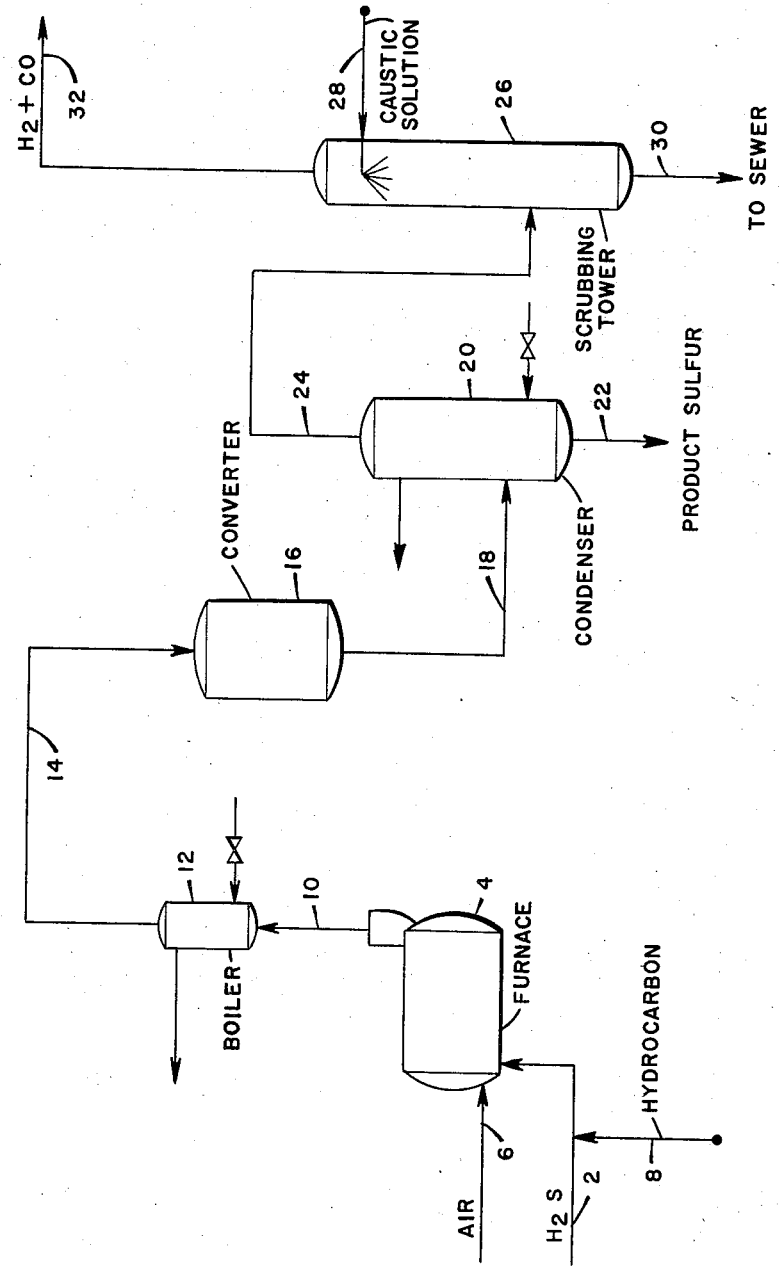
INVENTOR.
THEODORE Q. ELIOT
BY
ATTORNEY

United States Patent Office 2,889,207
Patented June 2, 1959

2,889,207

METHOD FOR RECOVERY OF SULFUR FROM HYDROGEN SULFIDE-CONTAINING GASES

Theodore Q. Eliot, Tulsa, Okla., assignor to Pan American Petroleum Corporation, a corporation of Delaware Application November 12, 1954, Serial No. 468,341

9 Claims. (Cl. 23—225)

The present invention relates to the recovery of sulfur from hydrogen sulfide-containing gases. More particularly, it pertains to a procedure for preparing free sulfur from gases containing hydrogen sulfide and sulfur dioxide and to a novel method for disposing of the water produced in the formation of sulfur dioxide required in the process.

In the recovery of elemental sulfur on a commercial scale from hydrogen sulfide-containing gases such as, for example natural gas and refinery gases, the hydrogen sulfide is usually first separated from the nonacid components usually by means of an ethanolamine scrubbing operation in a known manner. Depending upon the efficiency of this scrubbing step, the concentration of the acid components of the gas thus obtained may range from about 95 to about 99 percent. The sulfur recovery plants currently in operation which use such hydrogen sulfide-containing streams as feed depend upon the reactions:

(1) $\quad 2H_2S + 3O_2 \rightleftarrows 2SO_2 + 2H_2O$ (2) $\quad 2H_2S + SO_2 \rightleftarrows 3S + 2H_2O$ In some of these commercial processes, all of the feed gas is introduced into a furnace together with sufficient air or other suitable source of free oxygen to oxidize one-third of the hydrogen sulfide to sulfur dioxide in accordance with Equation 1 above. Other methods being used on an industrial scale involve dividing the feed gas and burning one-third of it completely to sulfur dioxide and water and thereafter combining these gaseous combustion products with the remaining two-thirds of the original feed gas to give a reaction mixture roughly equivalent to that produced when all of the feed gas is injected into a furnace as referred to above. From this point on, the procedures are similar in that the gaseous mixture thus obtained in either case is then introduced into one or more catalytic converters under conditions which favor the formation of free sulfur and water, as illustrated in Equation 2.

In the procedure involving the introduction of all the feed into the furnace, the reactions occurring are quite complex and are not definitely understood. However, it is known that considerable sulfur and some carbonyl sulfide are formed, together with sulfur dioxide and equivalent water. Theoretically, the sulfur produced at this stage passes out of the furnace in vapor form along with the other products and can be selectively condensed out of this stream prior to contact of the reactants with the catalyst in the subsequent conversion stage. As a practical matter, however, a very substantial proportion of the sulfur produced in the furnace remains therein and eventually finds its way between the furnace refractory and the outer shell and into various flow lines. While the existence of liquid sulfur in the furnace during actual operation can be tolerated, its presence therein in case of a forced shutdown of the unit could very easily render extensive damage to the refractory and other equipment, as well as seriously hinder start-up operations after the cause of the shutdown had been overcome. For these reasons, it is evident that any procedure which would result in a decrease in the amount of sulfur formed in the furnace would be a step in the right direction.

In both of the current commercial processes referred to above, the presence of unpredictable amounts of hydrocarbons in the feed gas has been the cause of considerable concern, because, under such circumstances, it is difficult to convert the proper amount of hydrogen sulfide to sulfur dioxide so that there will be approximately the stoichiometric quantity of the latter for subsequent reaction with the unconverted hydrogen sulfide. Accordingly, the feed gas prior to the combustion step must be analyzed to determine the concentration of the components therein and which of such components are combustible under the conditions of the process. Thus, in accordance with present day practice, it is essential that the supply of oxygen admitted to the system be carefully controlled. If an excess of oxygen is employed, hydrogen sulfide is wasted; if less than the stoichiometric quantity of oxygen is added, the conversion of hydrogen sulfide is incomplete. In determining the proper amount of oxygen to be added, current procedures require consideration of the hydrocarbon content of the feed gas. Accordingly, as presently practiced, sufficient oxygen is injected into the system to burn all hydrocarbons present, as well as to convert the desired amount of hydrogen sulfide to sulfur dioxide. It should be pointed out, however, that the use of oxygen for the purpose of burning hydrocarbons present in the feed actually is deleterious because this produces additional water in the system. As will be shown below, the presence of water in the system adversely affects the desired reaction in the catalytic converter.

In accordance with some commercial procedures involving introduction of the entire stream through the furnace, the effluent from the furnace is run through a condenser under conditions sufficient to effect a selective condensation of the sulfur formed in the combustion step before said effluent is sent to catalytic converters. This step is taken in order to improve the ultimate sulfur yield. However, the gain secured by the removal of free sulfur at this stage is small, as may be seen from the conversion reaction represented by the equations:

$$2H_2S + SO_2 \rightleftarrows 3/8\ S_8 + 2H_2O$$

or $$3/6\ S_6 + 2H_2O$$

or $$3/2\ S_2 + 2H_2O$$

All of the above forms of sulfur exist both at furnace and converter conditions. Since the sulfur yield obtainable in the subsequent catalytic converters is inversely proportional to the amounts of sulfur and water in the feed gas, it is obviously more important to remove the water from the boiler effluent than to remove the sulfur. Moreover, it is apparent that such water could be withdrawn from the system by condensation prior to admitting the reactants to the converter. Such a method of water removal, however, has a number of serious disadvantages. First of all, the condensation of steam in the presence of hydrogen sulfide and sulfur dioxide creates a very serious corrosion problem, as well as resulting in decreased yields of sulfur through the loss, by solution, of both hydrogen sulfide and sulfur dioxide in the condensate water. A further drawback of such a means of water removal is that the heat losses experienced would necessarily be high and additional heat would be required to heat the water-free gaseous mixture to the required temperature of 400–500° F. prior to the catalytic conversion step.

Accordingly, it is an object of my invention to provide a method for increasing the over-all sulfur yield, obtainable through the use of present day procedures, by the removal of water from said boiler effluent gas under conditions which avoid the disadvantages arising from water removal by straightforward condensation methods. It is a further object of my invention to accomplish this result in the absence of free oxygen other than that required for the combustion of the desired amount of hydrogen sulfide in the feed.

Contrary to the belief existing in the prior art, as evidenced by current practice, I have discovered that it is entirely unnecessary to add free oxygen in any form in the combustion step, previously referred to, for the purpose of removing hydrocarbons from the feed. Thus, I have found that, under the temperature and other conditions prevailing in the furnace, the hydrocarbons in the feed are reformed by water or by water and carbon dioxide with the resultant production of carbon monoxide and hydrogen, in accordance with the equations:

$$CH_4 + H_2O \rightarrow CO + 3H_2$$

$$2CH_4 + H_2O + CO_2 \rightarrow 3CO + 5H_2$$

In utilizing this discovery, the water produced during the combustion step, as well as any water which might have been present in the feed, can be removed to a very substantial extent with the attendant favorable effect on the equilibrium involved in the subsequent catalytic converters, resulting in increased yields of sulfur. Frequently, the acid feed gas may contain a small amount of hydrocarbons, i.e., 1 to 5 percent. However, the total permissible amount of hydrocarbons present in the combustion zone will depend upon the quantity of hydrogen sulfide in the feed gas since hydrogen sulfide is generally the principal source of water in the system. Thus, on a molar basis, the amount of water produced by combustion in the process, as operated in accordance with my invention, will be approximately equivalent to one-third of the quantity of hydrogen sulfide originally in the feed. Strictly speaking, the concentration of carbon dioxide in the feed gas also will have some bearing on the total amount of hydrocarbon that should be present in the combustion zone. However, generally, from a practical standpoint, the hydrogen sulfide content alone of the feed gas will serve as an adequate guidepost as to the amount of hydrocarbon that should be added, with the quantity of hydrocarbon to be added varying directly with the hydrogen sulfide concentration in the feed. In this regard, it is to be further pointed out that the feed gas employed in the combustion step should be at least about 15 percent hydrogen sulfide. At hydrogen sulfide concentrations appreciably below this level, it is difficult if not impossible to sustain combustion. With gases rich in hydrogen sulfide, the temperature in the combustion zone may range as high as 2000 to 2500° F.

The quantity of hydrocarbon to be added to the feed gas may vary. With increasing amounts of hydrocarbon and fixed concentrations of hydrogen sulfide, the quantity of carbonyl sulfide in the effluent gas usually increases. Ordinarily, I do not prefer to allow the concentration of carbonyl sulfide in the furnace effluent to exceed about 10 percent because of the difficulty of reconverting this material to free sulfur in the subsequent catalytic converters. Accordingly, with the majority of feed gas streams, the quantity of hydrocarbon added may generally range from about 1 to about 20 mol percent, based upon acid gas feed. Also, it will be apparent that with a feed gas having a fixed concentration of hydrogen sulfide, the amount of hydrocarbon employed will depend upon its molecular weight, with smaller concentrations of higher molecular weight hydrocarbons being required for the removal of a fixed amount of water from the system.

My invention may be further illustrated by reference to the accompanying flow diagram, wherein feed gas in line 2 containing 66 percent hydrogen sulfide, 32 percent carbon dioxide and 2 percent methane is introduced into furnace 4 where it is mixed with sufficient air added through line 6 to oxidize only one-third of the hydrogen sulfide present. Methane, amounting to 10 percent of the acid gas, is added via lines 8 and 2, giving an adjusted methane concentration of approximately 11 percent. Combustion of this mixture is initiated and temperatures within the furnace 4 of the order of 1300°–2000° F. are generated. Products of combustion, as well as unconverted hydrogen sulfide, leave the furnace through line 10 and enter waste heat boiler 12, where high-pressure steam is generated. The effluent from boiler 12, which has been cooled to 400–600° F., has the following composition:

Table 1

| Component | Mols/Hr. | Mol Percent |
| --- | --- | --- |
| $H_2S$ | 18.0 | 6.8 |
| $SO_2$ | 14.0 | 5.3 |
| $COS$ | 17.0 | 6.4 |
| $CO_2$ | 15.4 | 5.8 |
| $CO_2$ | 110.8 | 41.6 |
| $N_2$ | 39.2 | 14.8 |
| $H_2$ | 10.4 | 3.9 |
| $CO$ | 7.3 | 2.7 |
| S as $S_2$ | 33.8 | 12.7 |
| $H_2O$ | | |
| Total | 265.9 | 100.0 |

The effluent, having the composition indicated above, is next taken through line 14 and introduced into converter 16 which is filled with a suitable catalyst, such as bauxite. The temperature of the gas stream in line 14 may vary rather widely, depending at least in part, on the carbonyl sulfide content thereof. Thus, in the case of streams containing only 1 to 3 percent carbonyl sulfide, the inlet temperature of the gas may range from about 400–500° F. As the carbonyl sulfide content of the boiler effluent approaches about 10 percent, however, the gas inlet temperature in converter 16 should be of the order of about 600° F. in order to insure conversion of the carbonyl sulfide to free sulfur. Also, with streams having a relatively high carbonyl sulfide content, it will be found desirable to operate at somewhat reduced space velocities. Under conditions of increased temperatures and reduced space velocities, conversion of the sulfur contained in compounds, such as carbonyl sulfide and carbon disulfide, into elemental sulfur is generally assured. In carrying out the process, additional converters, not shown, may be employed to secure maximum recovery of free sulfur.

Conversion products thus produced are withdrawn from converter 16 through line 18 at a temperature in the neighborhood of about 600°–800° F. after which they are led to condenser 20 where liquid product sulfur forms and is withdrawn through line 22 at a temperature of 300° 325° F. The uncondensed gases leaving the top of the condenser through line 24 are next sent to caustic scrubber 26 where said gases are countercurrently scrubbed with a descending aqueous spray of dilute caustic, e.g. 10 to 15 percent, added through line 28. This treatment separates hydrogen and carbon monoxide from any acidic components in the stream at this stage, such as carbon dioxide, as well as unconverted hydrogen sulfide and sulfur dioxide. The acidic materials neutralized in this manner are withdrawn from the system in the form of a dilute aqueous solution through line 30; gaseous products thus separated, including hydrogen and carbon monoxide, are withdrawn from the scrubbing tower through line 32 and may, if desired, be used as plant fuel.

To compare the results obtained by practicing the process of my invention with those secured when operating in accordance with the prior art, a feed gas of the same composition as that introduced into line 2 is employed without the addition of extra methane to the system. The composition of the resulting boiler effluent is found to be as follows:

Table II

| Component | Mols/Hr. | Mol Percent |
|---|---|---|
| $H_2S$ | 14.0 | 5.9 |
| $SO_2$ | 11.2 | 4.7 |
| $COS$ | 6.5 | 2.7 |
| $CO_2$ | 22.2 | 9.3 |
| $N_2$ | 110.8 | 46.4 |
| $H_2$ | 4.6 | 1.9 |
| $CO$ | 2.4 | 1.0 |
| S as $S_2$ | 15.9 | 6.7 |
| $H_2O$ | 51.0 | 21.4 |
| Total | 238.6 | 100.0 |

From a comparison of the results secured under the two sets of conditions indicated above, it is seen that the addition of 10 percent methane effected a decrease in sulfur content of the boiler effluent from 6.7 to 2.7 mol percent, a reduction in water content from 21.4 to 12.7 mol percent and very substantially increased the concentrations of both hydrogen and carbon monoxide. The reduction in mols of water of the order of 35 mol percent is, from the standpoint of equilibrium concentrations, of significant influence in increasing sulfur recovery yields in the subsequent catalytic conversion step. Thus, in operations involving use of my invention, sulfur is recovered in yields ranging from about 92 to about 94 percent, whereas with operations giving a boiler effluent composition such as that illustrated in Table II, yields ranging from about 88 to about 90 percent are realized.

As previously indicated, it will be appreciated that the principles of my invention may also be used in sulfur recovery processes where only one-third of the hydrogen sulfide feed stream is diverted and subjected to a combustion step to produce sulfur dioxide in contrast to the procedure illustrated in the accompanying flow diagram.

I claim:

1. In a process for the production of free sulfur from hydrogen sulfide present in a gaseous hydrocarbon mixture in concentrations of at least about 15 mol percent wherein the hydrogen sulfide in said mixture is subjected to oxidation in the presence of free oxygen to convert approximately one-third of said hydrogen sulfide to sulfur dioxide followed by reaction of sulfur dioxide with the remaining unconverted hydrogen sulfide to produce free sulfur in a known manner, the improvement which comprises adjusting the hydrocarbon content of said mixture prior to said oxidation step to an amount corresponding to not more than about one-third, on a molar basis, of the hydrogen sulfide in said mixture, so that the water produced in said step in accordance with the exothermic reaction $$2H_2S + 3O_2 \rightleftharpoons 2SO_2 + 2H_2O$$

will react during said oxidation step substantially completely with said hydrocarbon at temperatures of from about 1300° to about 2500° F. by reforming said hydrocarbon with steam to produce carbon monoxide and hydrogen.

2. The process of claim 1 in which the hydrogen and carbon monoxide thus produced are separated from the acidic gaseous components of the mixture resulting from said oxidation step.

3. The process of claim 1 in which methane is employed in adjusting the hydrocarbon content of said mixture prior to combustion.

4. In a process for the production of free sulfur from hydrogen sulfide present in a gaseous hydrocarbon mixture in a concentration of at least about 15 mol percent wherein the entire mixture is introduced into a combustion zone along with sufficient free oxygen to oxidize approximately one-third of said hydrogen sulfide to sulfur dioxide, the improvement which comprises adjusting the hydrocarbon content of said mixture prior to oxidation thereof to an amount corresponding to not more than about one-third, on a molar basis, of the hydrogen sulfide in said mixture, so that the water produced during such oxidation step in accordance with the exothermic reaction $$2H_2S + 3O_2 \rightleftharpoons 2SO_2 + 2H_2O$$

will react during said oxidation step substantially completely with said hydrocarbon at temperatures of from about 1300° to about 2500° F. by reforming said hydrocarbon with steam to produce carbon monoxide and hydrogen.

5. The process of claim 4 in which methane is employed to adjust the hydrocarbon content of the mixture subjected to said oxidation step.

6. In a process for the production of free sulfur from hydrogen sulfide present in a gaseous hydrocarbon mixture in concentrations of at least 15 mole percent wherein one-third of said mixture is diverted into a combustion zone and the hydrogen sulfide therein converted substantially completely to sulfur dioxide, and the latter is then reacted with the remaining two-thirds of the hydrogen sulfide in said mixture to produce free sulfur in a known manner, the improvement which comprises adjusting the hydrocarbon content of said diverted mixture prior to the combustion step to an amount corresponding to not more than about one-third, on a molar basis, of the hydrogen sulfide in said mixture, so that the water produced in said step in accordance with the exothermic reaction $$2H_2S + 3O_2 \rightleftharpoons 2SO_2 + 2H_2O$$

will react during said combustion step substantially completely with said hydrocarbon at temperatures of from about 1300° to about 2500° F. by reforming said hydrocarbon with steam to produce carbon monoxide and hydrogen.

7. The process of claim 6 in which methane is employed to adjust the hydrocarbon content of said mixture prior to said oxidation step.

8. In a process for the production of free sulfur from hydrogen sulfide present in a gaseous mixture in concentrations of at least about 15 mol percent wherein the hydrogen sulfide in said mixture is subjected to oxidation in the presence of free oxygen to convert approximately one-third of said hydrogen sulfide to sulfur dioxide followed by reaction of sulfur dioxide with the remaining unconverted hydrogen sulfide to produce free sulfur in a known manner, the improvement which comprises adding gaseous hydrocarbon to said mixture prior to said oxidation step in an amount sufficient to correspond to not more than about one-third, on a molar basis, of the hydrogen sulfide in said mixture, so that the water produced in said step in accordance with the exothermic reaction $$2H_2S + 3O_2 \rightleftharpoons 2SO_2 + 2H_2O$$

will react during said oxidation step substantially completely with said hydrocarbon at temperatures of from about 1,300° to about 2,500° F. by reforming said hydrocarbon with steam to produce carbon monoxide and hydrogen.

9. In a process for the production of free sulfur from hydrogen sulfide present in a gaseous mixture in a concentration of at least about 15 mol percent wherein the entire mixture is introduced into a combustion zone along with sufficient free oxygen to oxidize approximately one-third of said hydrogen sulfide to sulfur dioxide, the improvement which comprises adding gaseous hydrocarbon to said mixture prior to said oxidation step in an amount sufficient to correspond to not more than about one-third, on a molar basis, of the hydrogen sulfide in said mixture, so that the water produced during such oxidation step in accordance with the reaction $$2H_2S + 3O_2 \rightleftarrows 2SO_2 + 2H_2O$$

will react during said oxidation step substantially completely with said hydrocarbon at temperatures of from about 1,300° to about 2,500° F. by reforming said hydrocarbon with steam to produce carbon monoxide and hydrogen.

References Cited in the file of this patent

UNITED STATES PATENTS

| | | |
|---|---|---|
| 1,922,872 | Thompson | Aug. 15, 1933 |
| 2,169,379 | Barkholt | Aug. 15, 1939 |
| 2,650,154 | Anderson | Aug. 25, 1953 |
| 2,676,156 | Bailey | Apr. 20, 1954 |